United States Patent
Ono

(10) Patent No.: US 7,499,202 B2
(45) Date of Patent: Mar. 3, 2009

(54) COLOR IMAGE DATA CORRECTING METHOD, COLOR IMAGE DATA CORRECTING DEVICE, AND COLOR CORRECTION TABLE PRODUCING PROGRAM

(75) Inventor: Satoru Ono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 897 days.

(21) Appl. No.: 11/012,235

(22) Filed: Dec. 16, 2004

(65) Prior Publication Data
US 2005/0146737 A1 Jul. 7, 2005

(30) Foreign Application Priority Data
Dec. 19, 2003 (JP) ............................ 2003-422421

(51) Int. Cl.
*H04N 1/60* (2006.01)
*H04N 1/56* (2006.01)
*H04N 1/50* (2006.01)
*G06K 9/00* (2006.01)

(52) U.S. Cl. ...................... 358/518; 358/3.23; 358/504; 358/525; 358/523; 358/1.9; 382/162; 382/167; 382/300

(58) Field of Classification Search ................. 358/518, 358/1.9, 523, 525, 520, 3.23, 504; 345/591, 345/600, 604; 382/162, 167, 300
See application file for complete search history.

(56) References Cited

U.S. PATENT DOCUMENTS

| 5,502,799 | A  | * | 3/1996  | Tsuji et al. ................... 345/600 |
| 7,271,933 | B2 | * | 9/2007  | Kato et al. ................... 358/1.9  |
| 2004/0257378 | A1 | * | 12/2004 | Braun et al. ................. 345/591 |

FOREIGN PATENT DOCUMENTS

JP    2000-209450 A    7/2000

* cited by examiner

*Primary Examiner*—Charlotte M Baker
(74) *Attorney, Agent, or Firm*—Sughrue Mion, PLLC

(57) ABSTRACT

There has been a room for improvement of calibration accuracy. The predetermined color patches are printed on the basis of the patch image data for printing a plurality of patches of which the color gradation values have been changed for each ink color used in the printing device, the color values of the color patches are acquired by resorting to the colorimetry of the printed color patches, the color values corresponding to all the color gradation values of the color correction table are interpolated and acquired by referring the acquired color values and by using the predetermined function, the color values corresponding to all the color gradation values acquired by the interpolation and the standard values that are the color values of the standard printed results are contrasted, and on the basis of the contrast results, a color correction table for correcting the color image data is produced in such a way that printed results equivalent to the standard printed results corresponding to the color image data of a freely chosen color gradation value may be obtained by the printing device.

2 Claims, 11 Drawing Sheets

COLOR IMAGE DATA CORRECTING METHOD, COLOR IMAGE DATA CORRECTING DEVICE, AND COLOR CORRECTION TABLE PRODUCING PROGRAM

BACKGROUND OF THE INVENTION

1. Field of the Invention

The present invention relates to a color image data correcting device, a color image data correcting method, and a color correction table producing program.

2. Description of the Prior Art

As a prior art, a medium recording a color-correction-table producing program including a step of calculating the correction correspondence relationship for changing the color-image data mentioned above so that the printed result of the standard color intended by the color-image data may be acquired based on the actual colorimetry data for printed results based on the color image data of a plurality of predetermined color gradation values for colorimetry (for example, see Japanese Patent Application Laid Open 2000-209450).

According to the present invention, when a calibration is made to ensure that a printed result with same colors would be outputted when printed on the basis of the color image data of same color gradation values between the objective printer and the standard printer, corrected actually measured color data are generated respectively by using a prescribed correction coefficient for a plurality of actually measured color data acquired by measuring color patches. Then, the corrected actually measured color data and the standard color data are contrasted, a combination with the minimum number of errors is identified, and the color gradation value of the standard color data and the color gradation value of the actually measured data mentioned above are correlated. And a table wherein corrected color gradation values that should be given to obtain printed results matching the standard color data in the desired gradation values are correlated for all the gradation values is produced by referring to the correspondence relationship of a plurality of combinations of color gradation values thus acquired and by using the predetermined interpolation formula.

According to the prior art, primary information called color gradation values have been used as a parameter in the interpolation treatment for obtaining corrected color gradation values corresponding to the total color gradation values. In addition, due to errors contained in the actually measured color data, the corrected actually measured color data derived from such actually measured color data containing errors by using a correction coefficient that contains errors. Therefore, corrected color gradation values have been acquired on the basis of one-dimensional information containing errors, and there has been a room for improvement with respect to the improvement of calibration precision.

SUMMARY OF INVENTION

The present invention has been made in view of the issue described above, and its object is to provide a color image data correcting device, a color image data correcting method and a color correction table producing program that can execute highly accurate calibration operations.

In order to achieve the above object, one aspect of the present invention resides in a color image data correcting method for producing a color correction table for correcting multiple gradation color image data in order to correct color drifts in the printed results by printing devices and for correcting the color image data by means of the color correction table.

In the aspect, the method has:

a step wherein predetermined color patches are printed on the basis of the patch image data for printing a plurality of patches of which the color gradation values have been changed for each color of each color material for recording used in the printing devices;

a step wherein the color values of the color patches are acquired by measuring the color of the printed color patches;

a step wherein the color values corresponding to all the color gradation values of the color correction table are interpolated by referring the color values acquired and by using the predetermined function, and are acquired; and a step wherein the color values corresponding to all the color gradation values acquired by the interpolation and the standard values that are the color values of the standard printed results are contrasted, and on the basis of the contrast result, a color correcting table is produced for correcting the color image data in such a way that printed results equivalent to the standard printed results corresponding to the color image data of any color gradation values may be acquired by the printing devices.

In another aspect, the present invention can be embodied as a color image data correction device for carrying out such a method.

Such color image data correction device includes:

a color patch printer for printing the predetermined color patches based on patch image data for printing a plurality of patches of which the color gradation values have been changed for each color of each color material for recording used by the printing device, a color value acquirer for acquiring the color values of the color patches by measuring the color of the printed color patches, an interpolated color value acquirer for interpolating and acquiring color values corresponding to all the color gradation values of the color correction table by referring the acquired color values and by using the predetermined function, and a color correction table producer for contrasting the color values corresponding to all the color gradation values acquired by the interpolation and the standard values which are the color values of the standard printed results and producing a color correction table for correcting the color image data based on the contrast result in such a way that printed results equivalent to the standard printed results corresponding to the color image data of any color gradation values may be acquired by the printing device.

A color image data correcting device for carrying out this method produces a color correction table for correcting color image data of multiple color gradation values in order to correct color drifts in printed results of the printing device involved and corrects the color image data by using the color correction table. The continued use of a printing device produces changes due to passage of time such as errors occurring in the mechanism of printing. Such changes due to passage of time may often result in differences in coloring of the standard results of printing corresponding to the color image data of any color gradation value and the printed results by the printing device mentioned above based on the color image data of the same color gradation values. In order to correct such changes in the coloring of printed results, it is necessary to correct color image data expressed by color gradation values for each color material for recording used in printing devices.

Accordingly, the color patch printer prints predetermined color patches by relying on the patch image data for printing a plurality of patches in which the color gradation values has been changed for each color material for recording used in the printing device. The color value acquirer measures color patches printed with such discrete color gradation value and obtains the color values of the color patches. Then, the interpolated color value acquirer interpolates and acquires color values corresponding all the color gradation values of the color correction table by referring the color values acquired as mentioned above and by using the predetermined function. In other words, the interpolation of color values corresponding to all the color gradation values at the preceding stage when the color values acquired from the printed results by the printing device mentioned above and the standard values that are the color values of the standard printed results are contrasted enables to contrast the color values and the standard values mentioned above across all the color gradation values.

The color values obtainable by the color value acquirer include, for example, $L^*a^*b^*$ values or XYZ values. The interpolation of the color values corresponding to all the color gradation values by referring such actually measured color values results in each color value being interpolated based on information of a plurality of dimensions, and therefore it is possible to interpolate accurately the color values corresponding to all the color gradation values.

The color correction table producer compares the color values interpolated highly accurately across all the color gradation values and the standard values mentioned above. And the contrast results serve as the basis for producing a color correction table for correcting the color image data in such a way that printed results equivalent to the standard printed results corresponding to the color image data of any color gradation values may be acquired by the printing device. In other words, as the accuracy of interpolation of color values for comparison with the standard values improves, the correction of each color gradation value determined by the contrast result will be more accurate. As a result, the correction of the predetermined color image data by using the color correction table and the execution of a printing process with the printing device on the basis of the corrected color image data will enable to obtain equivalent printed results approximated with a high degree of accuracy to the standard printed results corresponding to the uncorrected color image data.

As an example of the method of interpolating color values with a high accuracy, the interpolated color value acquirer may include a step of selecting a higher degree polynomial expression incorporating color gradation values as variables by referring the color values acquired and the final step of interpolating the color values corresponding to all the color gradation values by using the higher degree polynomial expression. Since each color value referred can be correlated with the color gradation value of each patch measured, it is possible to express each color value with a higher degree polynomial expression wherein the corresponding color gradation values are taken as variables. In other words, the color value acquirer produces a higher degree polynomial expression in which a coefficient is selected by referring the color values measured. And when the higher degree polynomial expression is given any freely chosen color gradation values, it is possible to obtain color values corresponding to the freely chosen color gradation values.

And as another way for interpolating color values with a high accuracy, the interpolated color value acquirer may weight some of the color values to be referred for selecting a higher degree polynomial expression. For example, in selecting the higher degree polynomial expression, the extent of referring the color values will be increased in a color gradation region where the necessity of minimizing color shifts is high. Such a weighting will enable to calculate a higher degree polynomial expression that can interpolate color values by reflecting with a high accuracy the coloring characteristic of the printed result of the printing device in a same color gradation region.

As a reference point for laying weight mentioned above, the interpolated color value acquirer may select each color value acquired by resorting to the colorimetry of the patches corresponding to the maximum color gradation value and the minimum color gradation value. Normally, the patches corresponding to the maximum color gradation value are printed at a recording ratio of ink recording material per unit area of 100% or close to 100% and are printed at the maximum density. And patches corresponding to the minimum color gradation value are printed at a recording ratio of ink recording material per unit area of 0%, in other words they become blank patches. By laying a heavier weight on such color values acquired by measuring the color of the patches of the maximum density and the patches of the minimum density for selecting the higher degree polynomial expression than other reference points, a higher degree polynomial expression that can interpolate color values that reflect with a higher accuracy the coloring characteristic of the printed result of the printing device in color gradation regions in the vicinity of both values can be calculated.

When the higher degree polynomial expression is used to interpolate the color values corresponding all the color gradation values, the rule of experience shows that, while almost all the color values are interpolated with a high accuracy and draw a smooth curve in the predetermined color space, some color values are expressed in points largely deviated from an estimated interpolation curve. In order to avoid such deviated points from being acquired as color values, the interpolated color value acquirer may detect deviated points that have been formed at coordinates deviated in the predetermined direction from the estimated interpolation curve in the predetermined color space from among the color values interpolated by the higher degree polynomial expression. And when any deviated points are detected, color values may be interpolated by switching to interpolating calculations less likely to produce deviated points than the higher degree polynomial expression in a color gradation region where the deviated points have been detected.

As interpolating calculation methods less likely to produce deviated points, spline interpolating calculation method or linear interpolating calculation method having a lower interpolation accuracy than the higher degree polynomial expression are possible. Thus, by switching to interpolating calculation method having a lower interpolating accuracy but less likely to produce deviated points than the higher degree polynomial expression only in color gradation region where deviated points have been detected, deviated points are eliminated and color values generally interpolated with a high accuracy can be acquired across all the color gradation values.

In detecting the deviated points, the interpolated color value acquirer may detect the same based on the characteristics of changes in color values in relation with changes in color gradation values. The basic characteristics of changes in color values in relation with changes in color gradation values can be grasped by the ink characteristics of recording materials used, and the color values formed at coordinates incompatible with the characteristics of such changes in color values can be judged as representing deviated points. Therefore, a judgment made on the basis of the characteristics of changes in color values in relation to changes in the color gradation values will easily lead to the detection of the deviated points.

In the meanwhile, although it is possible to adopt various color spaces for the predetermined color space, it is preferable to adopt a color space wherein color differences can be evaluated by distance within the space. For example, L*a*b* color space, L*u*v* color space, XYZ color space, and the like can be adopted. When these color spaces are adopted, it will be possible to evaluate differences in color values by color differences.

The color values of printed results that can be acquired by changing the color gradation value of color image data inputted to perform the printing process by the printing device appear, in principle, somewhere on the line formed in the color space mentioned above by the higher degree polynomial expression or other interpolating calculations. Therefore, for another structure of the present invention, the color correction table producer acquires the color gradation values corresponding to the color values on the line whose color difference from the standard value corresponding to any freely chosen color gradation value from among the standard values mentioned above is the minimum. And upon investigating the correspondence relationship between the freely chosen color gradation values and the color gradation values acquired for all the color gradation values, it produces a color correction table showing the correspondence relationship. By correcting the color gradation value of the color image data by referring the color correction table, color gradation values giving equivalent color values approximated with a high accuracy to the standard values that should be essentially colored as printed results by the color gradation values of uncorrected color image data are acquired.

So far, the technical philosophy for producing a color correction table that can realize a highly accurate color correction has been described as an invention of a device. Such a technical philosophy can be materialized as an invention of method of realizing this however. Therefore, the invention according to above aspect will essentially produce a similar effect as the one described above. And the present invention can be carried out by having a computer execute a predetermined program to produce a color correction table. The present invention is applicable as its program, and in the invention according to above aspect, this will have basically the similar effect.

Of course, it is needless to say that the configuration mentioned above can be embodied in any way corresponding with the method or program mentioned above. And any storage medium may be used to provide a program related thereto. For example, a magnetic storage medium or a magneto-optical storage medium may be used, and any storage media that may be developed in the future may be considered likewise. And an embodiment in which a part is carried out in the form of software and another part is carried out in the form of hardware is completely homogeneous in the philosophy of the present invention, and it includes embodiments in which a part of the invention is stored in a storage medium to be read whenever it is necessary. Furthermore, with regards to the stage of copy such as primary copy or secondary copy, there is absolutely no room for questions and they are the same.

Other and further objects, features and advantages of the invention will appear more fully from the following description.

DESCRIPTION OF THE PREFERRED EMBODIMENTS

The embodiments of the present invention will be described according to the following order.

Incidentally, the embodiments described below use ink jet color printers for their printer. However, it is needless to say that the present invention can be applied on color printers of other systems such as, for example, electrophotographic laser beam printers and other printers.

(1) Configuration of the present invention.
(2) Calibrating process
(3) Conclusion (1) Configuration of the Present Invention.

Figure 1:
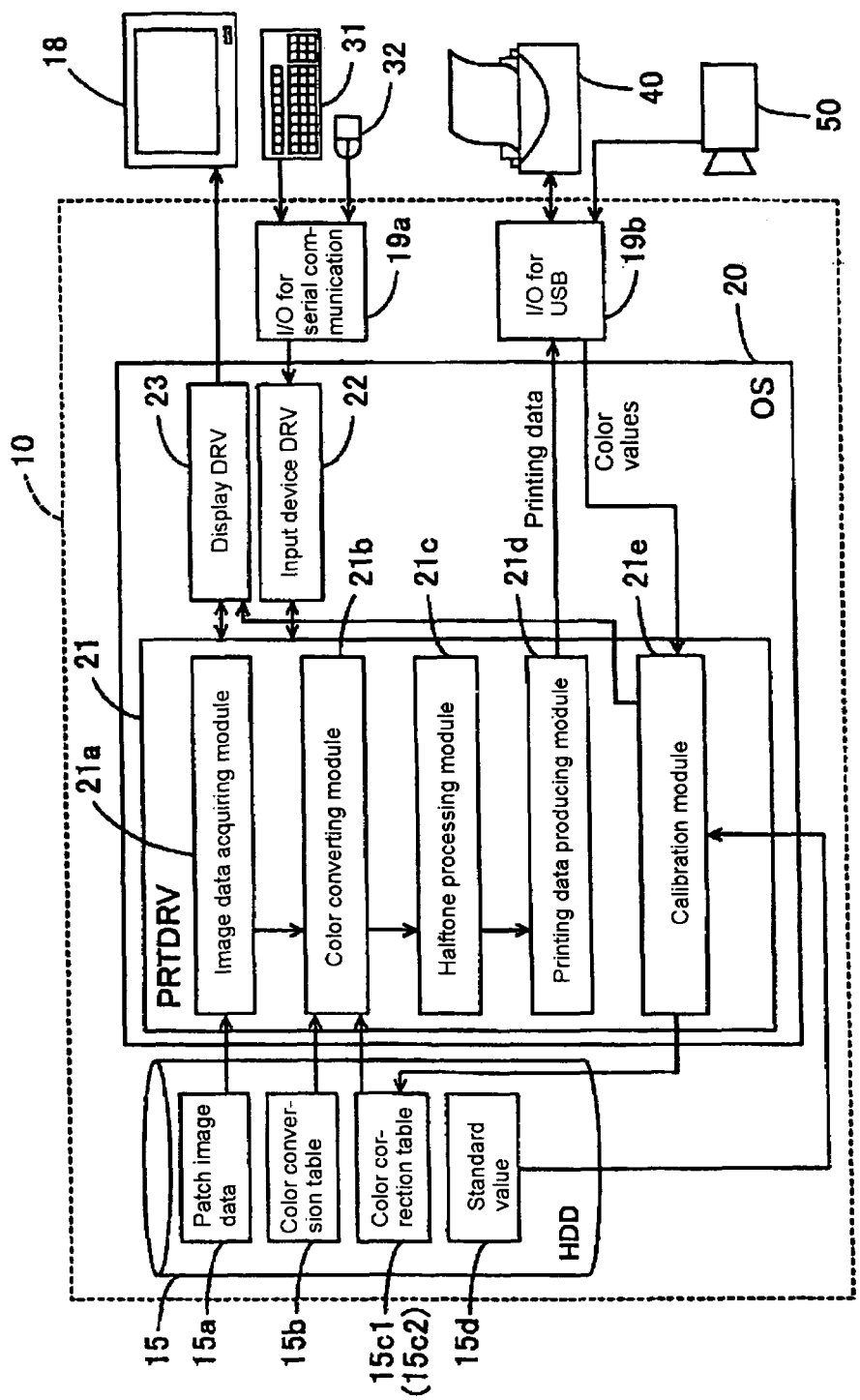
FIG. 1 is a block diagram showing the schematic configuration of the present invention.

FIG. 1 is a block diagram showing the schematic configuration of a computer related with an embodiment of the present invention. The computer 10 includes a CPU constituting the nucleus of the calculating process not shown, ROMs or RAMs as storage media and the like, and can execute the predetermined program by using HDD 15 and other peripherals. The computer 10 is connected with operating input devices such as a keyboard 31 or a mouse 32 through an I/O for serial communication 19a, and also with a display 18 for displaying the screen images through a video board not shown. It is also connected with a printer 40 through an I/O for USB 19b.

The computer 10 is also connected with calorimeter 50 through the I/O for USB 19b. The printer 40 in the present embodiment has a detachable mechanism for each color of the ink cartridge into which ink materials for recording of a plurality of colors, to which mechanism cartridges of various ink colors CMYKlclm (cyan, magenta, yellow, black, light cyan and light magenta) are loaded. The printer 40 can form a plurality of colors by combining these ink colors, and forms color images on the printing medium. Although the printer 40 in the present embodiment is an ink jet printer, the present invention can be applied to various types of printers including laser printers in addition to the ink jet printer.

Here, the configuration of using six (6) colored inks of CMYKlclm is not indispensable but the configuration of using four (4) colors of CMYK or seven (7) colors of MYKlclmDY (dark yellow) is acceptable. Of course, other colors such as, for example, R (red) or V (violet) can be used in place of lclm inks. A dark and light ink may be used in place of K ink. The colorimeter 50 irradiates printed matters with a light source having a known spectral reflectance, detects the spectral reflectance of the printed matter by detecting the reflected light and can output its color value, for example, L*a*b* value or XYZ value. In the present embodiment, the color value L*a*b* of the color patches printed by the printer 40 is measured.

The computer 10 related with the present embodiment includes an OS 20 in which a printer driver (PRTDRV) 21, an input device driver (DRV) 22 and a display driver (DRV) 23 are installed. The display driver (DRV) 23 is a driver that controls the display of the image to be printed in the display 18 and the display of the property screen of the printer, and the input device driver DRV 22 is a driver that receives code signals from the keyboard 31 and the mouse 32 inputted through the I/O for serial communication 19a and accepts the predetermined input operation.

The PRTDRV 21 can execute printing by carrying out the predetermined processing on the images for which the application program not shown gave print instructions or on the images of color patches described below. The PRTDRV 21 includes an image data acquisition module 21a for executing printing, a color conversion module 21b and half tone processing module 21c and a printing data producing module 21d. When the printing instruction is given, the PRTDRV 21 is driven, the PRTDRV 21 outputs data to the display DRV 23 and displays UI not shown and allows the input of instructions for displaying information showing the printing medium, image quality, printing speed and other printing conditions and for carrying out calibration.

When the user inputs information required for printing by the UI by operating the keyboard 31, the mouse 32 and the like, or gives an instruction for carrying out a calibration, each module of the PRTDRV 21 are started, and each module carries out the process for each pixel data of the image data and produces printing data. The printing data thus produced are outputted to the printer 40 through the I/O for USB 19b, and the printer executes printing based on the printing data.

More specifically, the image data acquiring module 21a acquires from the HDD 15 patch image data that show images 15a for which a printing instruction has been given by the application program and the images of color patches described below. At this time, if the number of pixels of the image data is excessive or insufficient, it carries out a resolution converting process as necessary in order to secure the pixels required for the printing. This image data is a dot matrix data that prescribes the color of each pixel by expressing the color gradation of each color component RGB (red, green and blue), and is a image data adopting a color system according to the sRGB standard each color consisting of 256 gradations in the present embodiment. Of course, JPEG image data adopting the YCbCr color system, image data adopting the CMYK color system and many other types of data can be adopted.

The color converting module 21 is a module for converting the color system that shows the color of each pixel, and converts the sRGB color system of the image data into the CMYKlclm color system composed of the ink (CMYKlclm) loaded on the printer 40 by referring as required the color conversion table 15b recorded on the HDD 15. The color conversion table 15b is a table that expresses color by each of the sRGB color system and the CMYKlclm color system, correlates both of them at the same time and describes this correlation for a plurality of colors. Therefore, with respect to a freely chosen color expressed by the sRGB color system, it is possible to calculate the colors of the CMYKlclm color system corresponding to the freely chosen color by an interpolating calculation by referring the color of the surrounding region and the sRGB color prescribed in the color conversion table 15b and to convert colors.

And the CMYKlclm color system data is a image data expressed in 256 gradations for each color of CMYKlclm, and each color gradation value corresponds to each pixel and the ink quantity of each color. For example, the quantity of ink that each color gradation value is fixed in advance by fixing the color gradation value in such a way that the ink recording ratio per unit area of 0-100% may correspond linearly to the color gradation value of 0-255, and the color gradation value is converted in such a way that the quantity of ink corresponding to each color gradation value may be chosen by the halftone processing module 21c.

However, even if the ink quantity meant by each color gradation value of CMYKlclm is fixed as described above, there is no assurance that the quantity of ink corresponding to the color gradation value will be always outputted correctly due to manufacturing errors for each unit of the printer 40. Therefore, the printer 40 according to the present embodiment is provided with a mechanism for compensating this type of errors. In other words, the HDD 15 records a color correction table 15c1 for correcting the color gradation value for each color, and the color converting module 21b corrects the color gradation values of CMYKlclm converted by the color conversion table 15b by referring the color correction table 15c1.

The HDD 15 records the color correction table 15c1 for adjusting to the color outputted by the predetermined standard printer produced by the manufacturer of the printer 40 before the shipment of the printer 40. However, due to changes by the passage of time in various mechanisms after the shipment of the printer 40, there can be color drifts between the color outputted by the printer 40 and the color outputted by the standard printer. Therefore, the user of the printer 40 can perform a calibration for producing his or her own color correction table 15c2 in place of the correction table 15c1 mentioned above. The calibration process is carried out by the calibration module 21e provided in the PRTDRV 21, and its details will be described further below.

When CMYKlclm data are acquired as a result of color conversion by the color converting module 21b, the halftone processing module 21c converts the color gradation value of each pixel expressed in the CMYKlclm color system into halftone image data specifying the jet/non jet of ink at each pixel. In other words, it decides the jet/non jet of ink drops for each pixel by the printer 40. Of course, it can be configured to be capable of not only deciding the jet/non jet of ink but also of gradually controlling the quantity of ink jet and also decide the magnitude of ink jet drop.

Upon receiving such halftone image data, the printing data producing module 21d rearrange the data in the order in which they will be used by the printer 40, and outputs them successively to the printer 40 by grouping the data in a unit of data used by a single main scanning. In other words, the printer 40 is provided with an array of jet nozzles as an ink jet device, and as the nozzle array has a plurality of jet nozzles arranged side-by-side in the sub-scanning direction, data separated by several dots in the sub-scanning direction are used at the same time.

Thus, data that should be used simultaneously out of those lined up in the main scanning direction are rearranged in order to be buffered at the same time by the printer 40. And the printing data producing module 21*d* adds predetermined information such as image resolution to the rearranged data to produce printing data, and output the data to the printer 40 through the I/O for USB 19*b*. When all the data required for the formation of image by the printer 40 are transmitted, the printer 40 prints images on the printing medium.

(2) Calibrating Process

Figure 2:
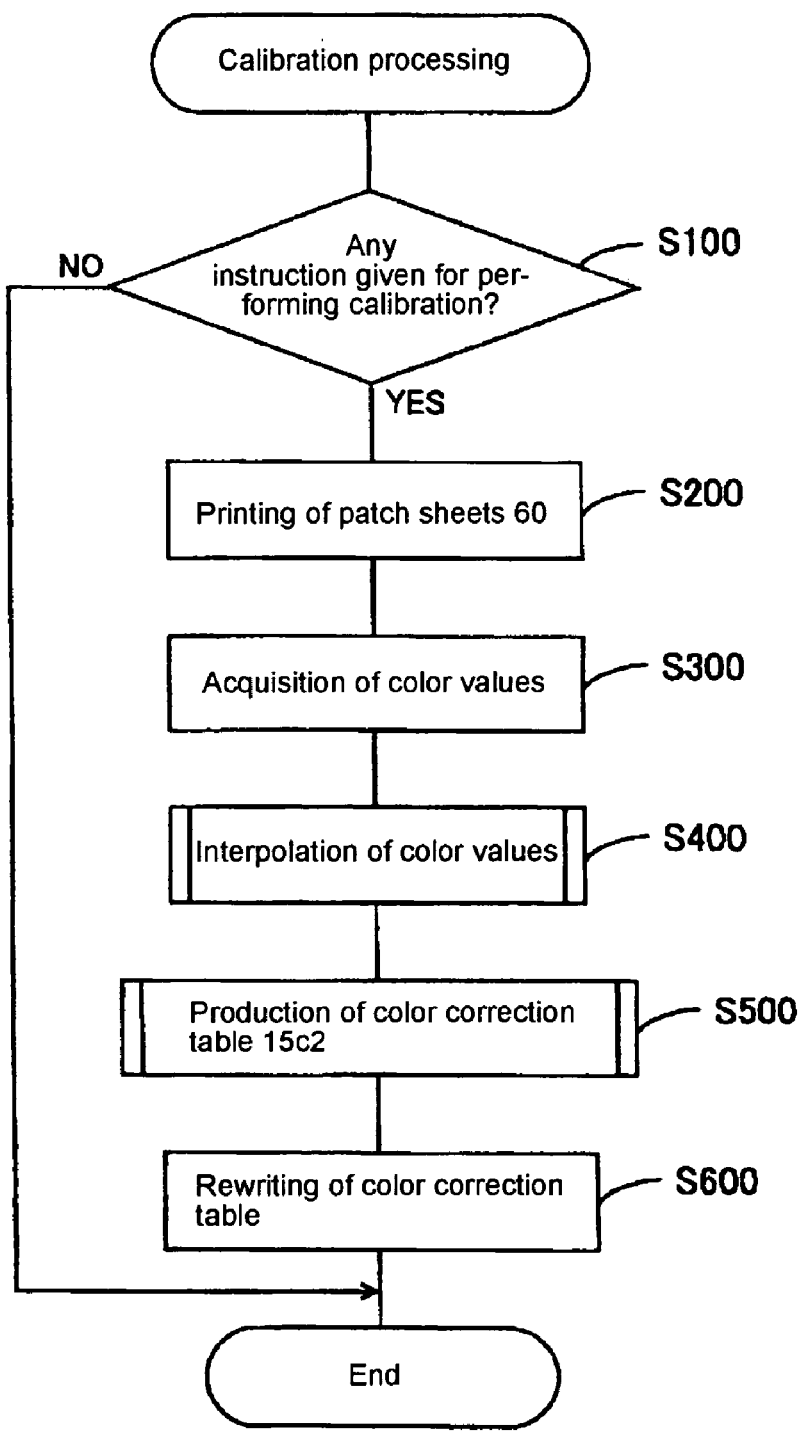
FIG. 2 is a flowchart showing the details of the calibrating process.

FIG. 2 is a flowchart showing the details of the calibration process.

As described above, the PRTDRV 21 includes a calibration module for producing a color correction table 15*c*2. The calibrating module 21*e* judges whether the user has given an instruction of performing a calibration from the UI or not, and when it has judged that the instruction has been given (step S100), it performs the following calibration process.

Upon receiving the instruction of performing the calibration, the calibration module 21*e* has the patch sheet 60 printed based on the patch image data 15*a* (step S20). The patch image data 15*a* are image data showing the color patches for measuring color by the colorimeter 50 when the calibration process is to be performed. They are image data constituted by the color gradation values by changing the values within a prescribed range for the whole color gradation range for each ink color CMYKlclm, and when the color gradation value is high, the quantity of ink used will increase.

Figure 3:
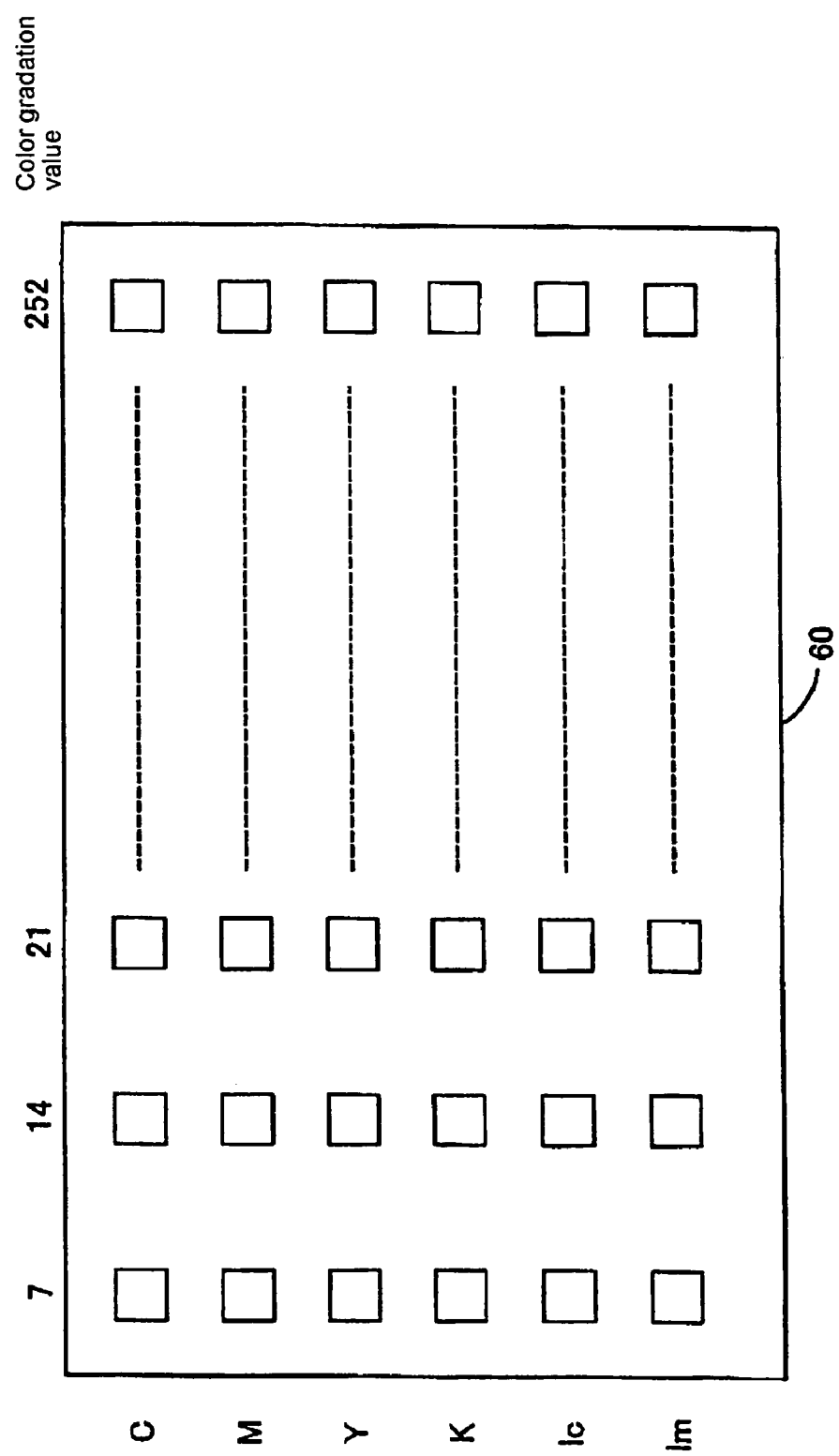
FIG. 3 is an illustration of a patch sheet.

FIG. 3 shows a patch sheet 60 to be printed by the printer 40 based on the patch image data 15*a*.

In the patch sheet 60, patches respectively having a predetermined area are to be printed by changing the color gradation values within each predetermined range (for example seven (7) gradations) for each ink color of CMYKlclm. In the figure, shown on the upper part of the patch sheet 60 is the color gradation value and on the left side the distinction of the ink color is shown. Since the ink recording ratio per unit area increases as the color gradation value of the ink rises higher, on the patch sheet 60 the color gradation shifts from lighter patches to darker patches as the position shifts from the left to the right side. The present embodiment adopted a fixed range of seven (7) color gradation values for printing the patch sheet. However, the range of color gradation values may not be fix.

Then, in step S300, the calibration module 21*e* acquires the color value of each color patch on the patch sheet 60 through the I/O for USB 19*b*. In other words, the user measures the patch sheet 60 by means of a calorimeter 50 following the predetermined order of color measurement, and the calibration module 21*e* obtains the color value as a result of the colorimetry.

When each color patch has been measured and their color values have been acquired as described above, then the predetermined higher degree polynomial expression is decided by referring the color values acquired, and the color values corresponding to all the color gradation values (256 gradations) are interpolated on the basis of the higher degree polynomial expression (step S400). In other words, when the color patches have been measured and the color values corresponding to a plurality of color gradation values have been acquired, the color values and the standard values 15*d* that are the color values of the standard printed results are not compared, the color values corresponding to all the color gradation values are interpolated and acquired before the contrasting work. Here the standard printed results means the color patches printed by the predetermined standard printer for all the color gradation values for each color of CMYKlclm, and the standard values 15*d* means the color values acquired by measuring such standard printed results by a colorimeter.

In the past, when the color values corresponding to a plurality of color gradation values have been acquired by measuring color patches, the color values and the standard values have been compared, and the correspondence relationship between the plurality of color gradation values and the corrected color gradation values are acquired. And the correspondence relationship between the pre-correction color gradation values and the corrected ones is interpolated by referring such correspondence relationship by a predetermined function with regard to all the color gradation values to produce the color correction table mentioned above. In this case, when efforts are made to seek corrected color gradation values corresponding to all the color gradation values, interpolating process is carried out by referring only one-dimensional information called color gradation values and therefore the accuracy of the interpolating process cannot be considered to be high.

However, in the present invention as described above, the color values corresponding all the color gradation values are interpolated before the color values acquired by the colorimetry are contrasted with the standard values 15*d*. Since color values are identified by the four-dimensional information consisting of the color gradation values respectively corresponding thereto and L* value, a* value and b* value, when color values corresponding to all the color gradation values are interpolated by taking these color values as the reference points, new color values will be acquired based on the four-dimensional information. As a result, the color values corresponding to all the color gradation values can be interpolated with a high accuracy.

When the color values corresponding to all the color gradation values have been interpolated and acquired as mentioned above, in step S500, the color values and the standard values 15*d* produced in advance and recorded on the HDD 15 are contrasted to produce a color correction table 15*c*2 (step S500). In other words, it is possible to produce a color correction table 15*c*2 that can resolve color drifts more accurately than in the past by contrasting the color values interpolated with a high accuracy as mentioned above and the standard values and thereby calculating the correction of each color gradation value.

And the color correction table 15*c*1 is rewritten by the color correction table 15*c*2 produced as described above (step S600).

Figure 4:
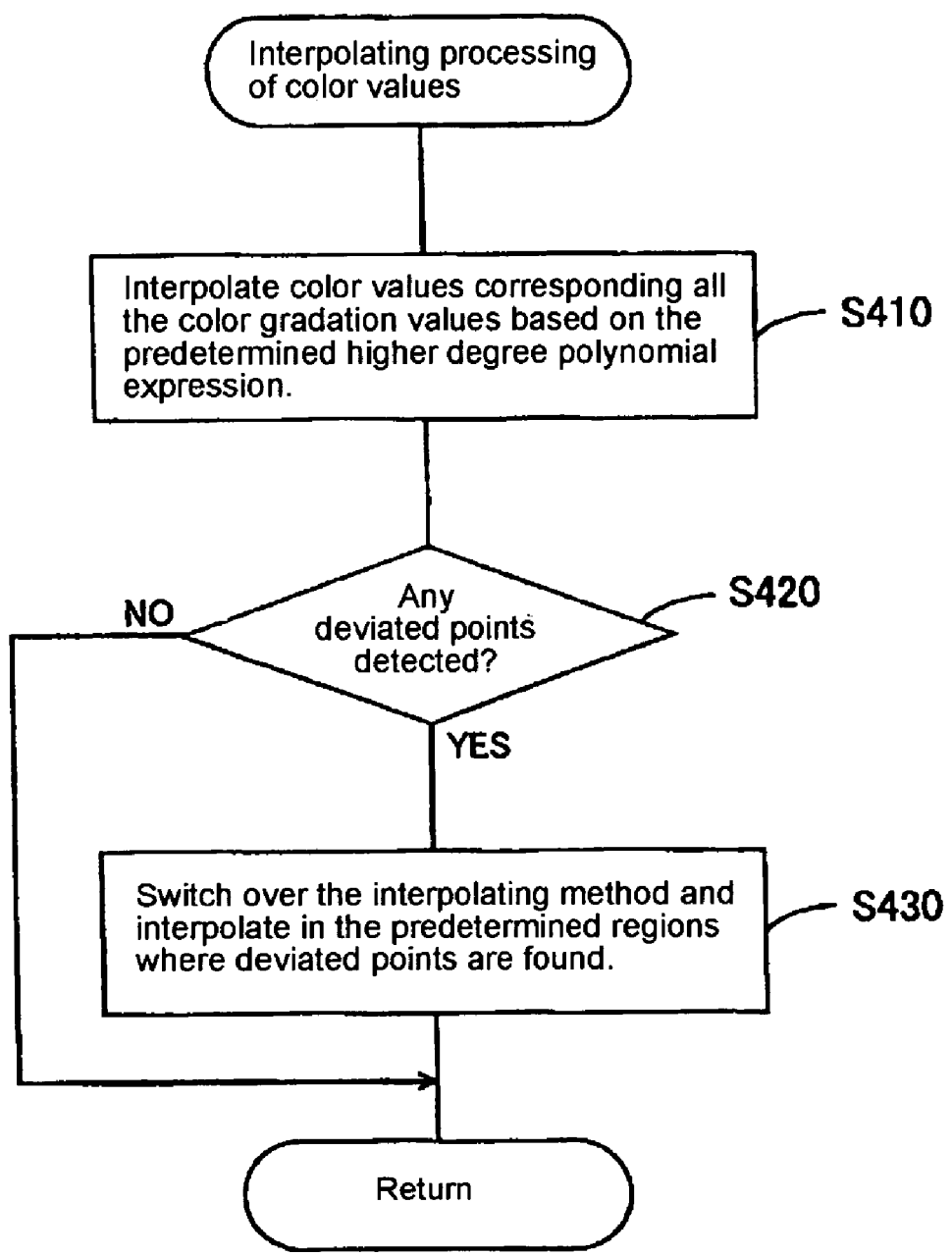
FIG. 4 is a flowchart showing the details of the interpolating process of color values.

FIG. 4 is a flowchart describing in detail the contents of the interpolating process of the color value.

The calibration module 21*e* chooses a higher degree polynomial expression capable of calculating color values corresponding to freely chosen color gradation values by referring the color values acquired by the colorimetry, and obtains the color values corresponding to all the color gradation values from the higher degree polynomial expression (step S410). In other words, when the color value L*a*b* is known in relation to a certain color gradation value, it is enough to assume a higher degree polynomial expression taking the color gradation value as a variable to calculate the coefficient of the function from each color value L*a*b*.

Figure 5:
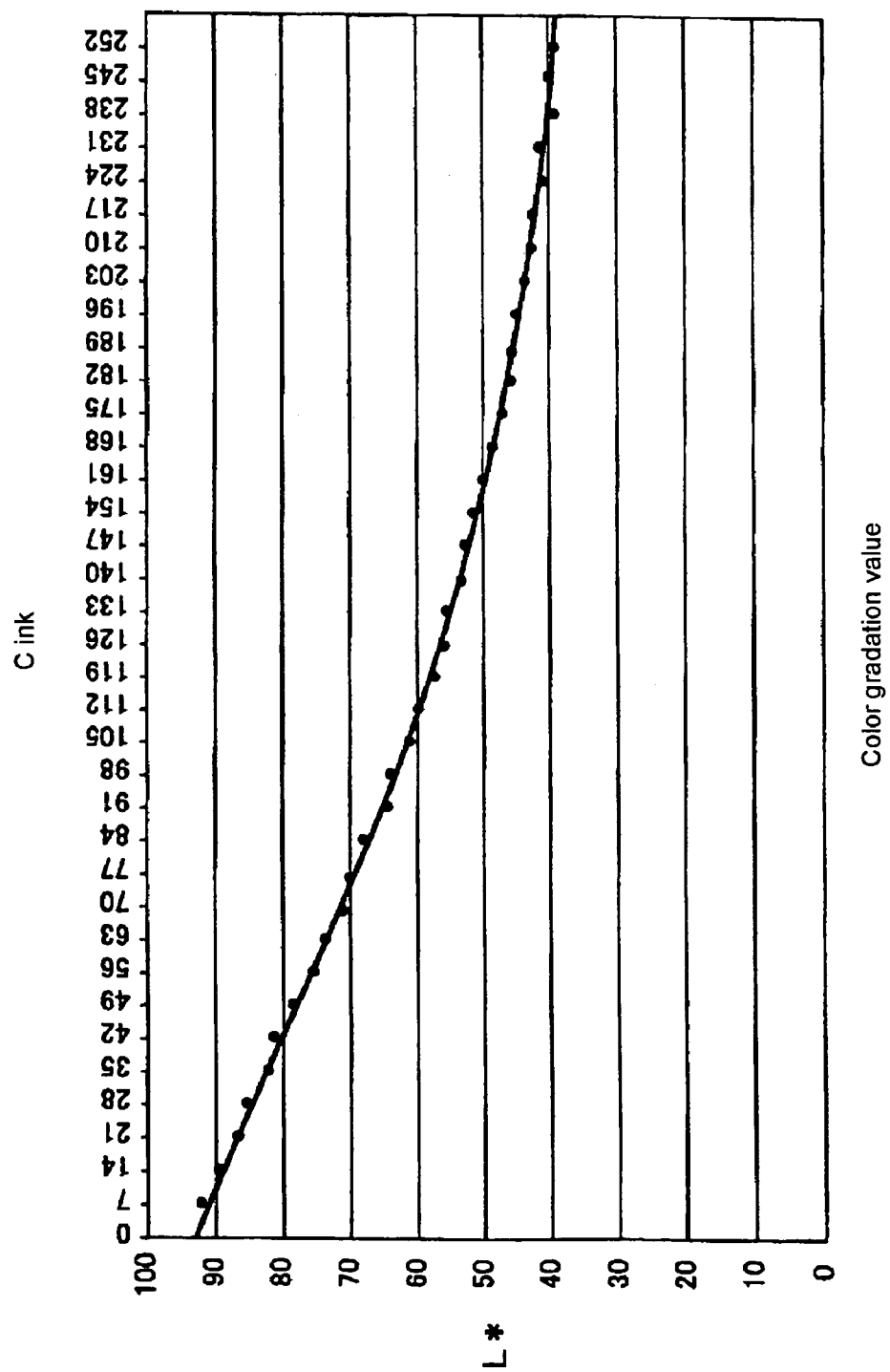
FIG. 5 is an illustration showing the relationship between color gradation values and L*.
Figure 6:
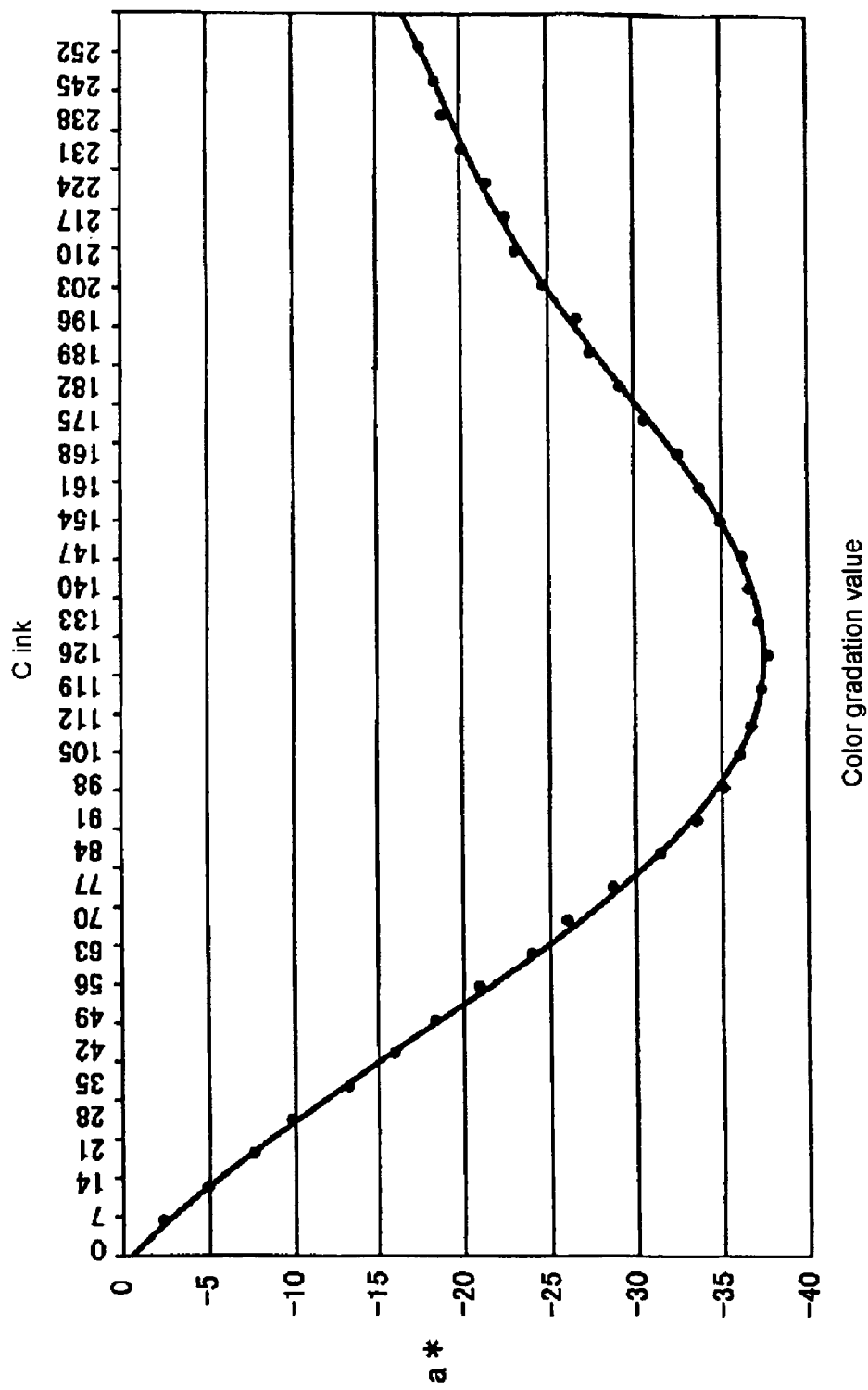
FIG. 6 is an illustration showing the relationship between color gradation values and a*.
Figure 7:
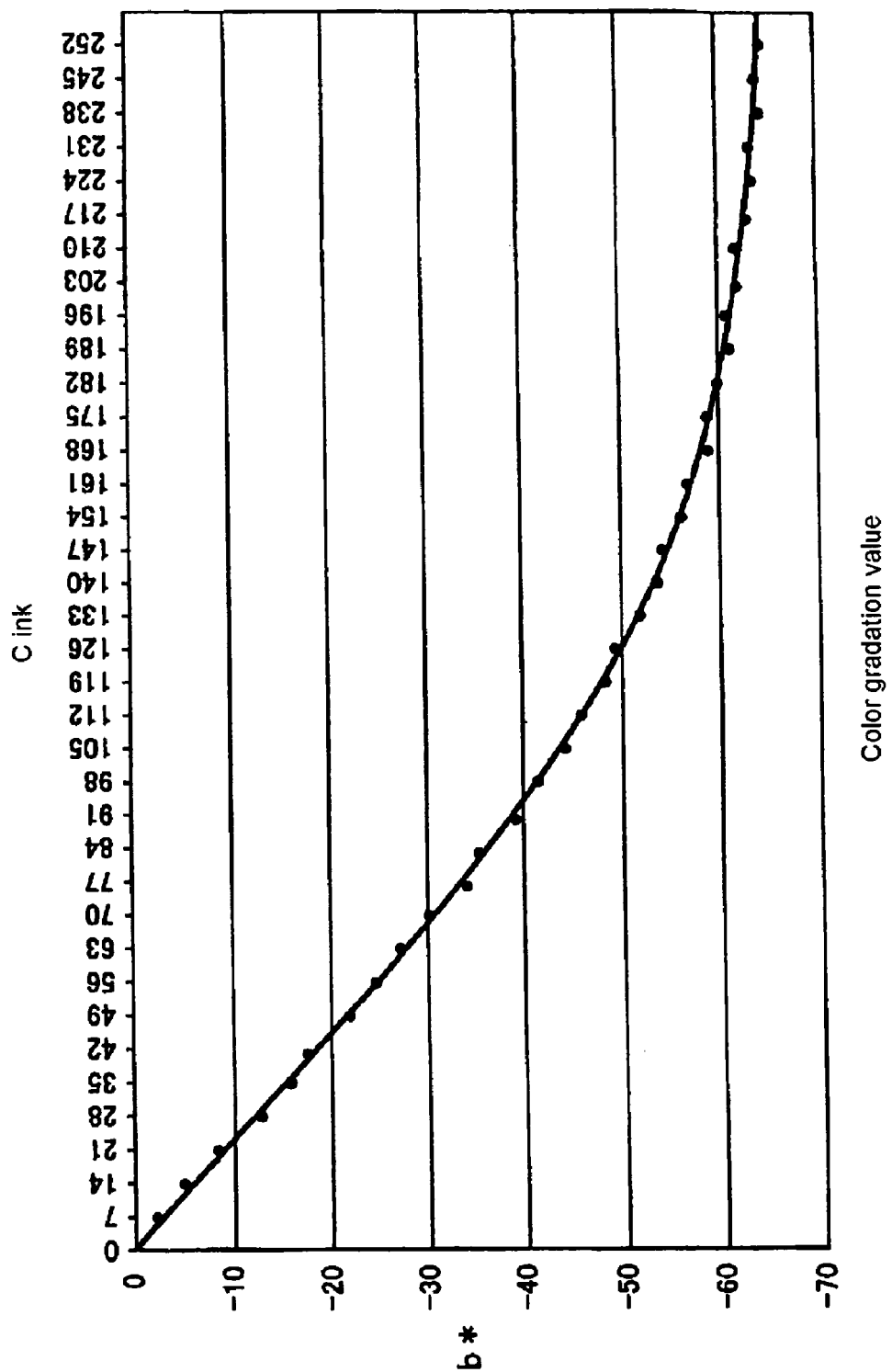
FIG. 7 is an illustration showing the relationship between color gradation values and b*.

FIGS. 5-7 show a function that describes respectively L* value, a* value, and b* value taking C ink as an example.

In these figures, the horizontal axis represents the color gradation values, and the vertical axis represents respectively L* value, a* value, and b* value, and the black circles in each figure represents each of the color values acquired by the colorimetry. Here, each higher degree polynomial expression is taken as an approximation equation drawing a curve having a minimum sum of square of the distance plotted from each color value (black circle). Once such a higher degree polynomial expression is chosen, it is possible to calculate readily the color values corresponding to freely chosen color gradation values. In addition, as long as it is a higher degree polynomial expression capable of interpolating with a high accuracy each L* value, a* value and b* value corresponding to each color gradation value, the degree of functions is not limited. And instead of choosing a function separately describing each L* value, a* value and b* value, a predetermined higher degree polynomial expression taking color gradation value as a variable in the L*a*b* color space may be adopted.

In selecting the higher degree polynomial expression, it is possible to calculate by weighting some color values among those referred. It is preferable in particular to weight the color values corresponding to the maximum color gradation value and the minimum color gradation value more than the other color values. Here, the weighting of some color values is realized by supposing that there exists not only one but a plurality of such color values in the color space L*a*b* mentioned above. In view of the fact that the higher degree polynomial expression is formulated in such a way that it may produce a curve having a minimum sum of square of distance from each color value, when a color value is weighted, the higher degree polynomial expression is formulated in such a way that it may produce a curve approaching more closely the coordinate of the color value in order to minimize the sum of square mentioned above.

When the color values corresponding to the maximum color gradation value and the minimum color gradation value are weighted, the higher degree polynomial expression produces an interpolated curve approaching more closely the coordinate of the color values corresponding to the maximum color gradation value and the minimum color gradation value. As a result, in the vicinity of both color gradation values, each color value more faithful to the coloring characteristics of the printer 40 will be interpolated. The color value corresponding to the maximum color gradation value has been acquired from the patch with the maximum density of ink recording ratio per unit area, and the color value corresponding to the minimum color gradation value has been acquired from the patch with the minimum density of ink recording ratio per unit area. Even in the middle of color drift between the standard printer and the printer 40, any drift in the coloring of the maximum density and the coloring of the minimum density should be suppressed to the maximum extent possible. Therefore, in the vicinity of both color gradation values color values are interpolated more accurately by weighting the color values corresponding to the maximum color gradation value and the minimum color gradation value as described above.

When a higher degree polynomial expression is selected as described above to produce a curve that can interpolate the color values corresponding to all the color gradation values, in normal cases, as shown in FIGS. 5-7, a curve properly representing the characteristics of changes in color values in relation to changes in color gradation values is drawn. Here, the characteristics of changes in color values in relation to changes in color gradation values are approximate characteristics of changes in color values when color gradation values have changed, and are known in advance from the characteristics of the ink used. For example, it is possible to mention a characteristic in that L* value and b* value among the color values fall down when the color gradation value is increased.

However, curves drawn by the higher degree polynomial expression are not always faithful to the characteristics mentioned above, and the rule of experience shows that in some color gradation region a curve forming interpolated points at coordinates far apart from the assumed curve is often drawn. Therefore, in step S420, color values interpolated at coordinates far apart from such assumed curve (hereinafter referred to as "deviated points") will be detected from the curve drawn by the higher degree polynomial expression.

Figure 8:
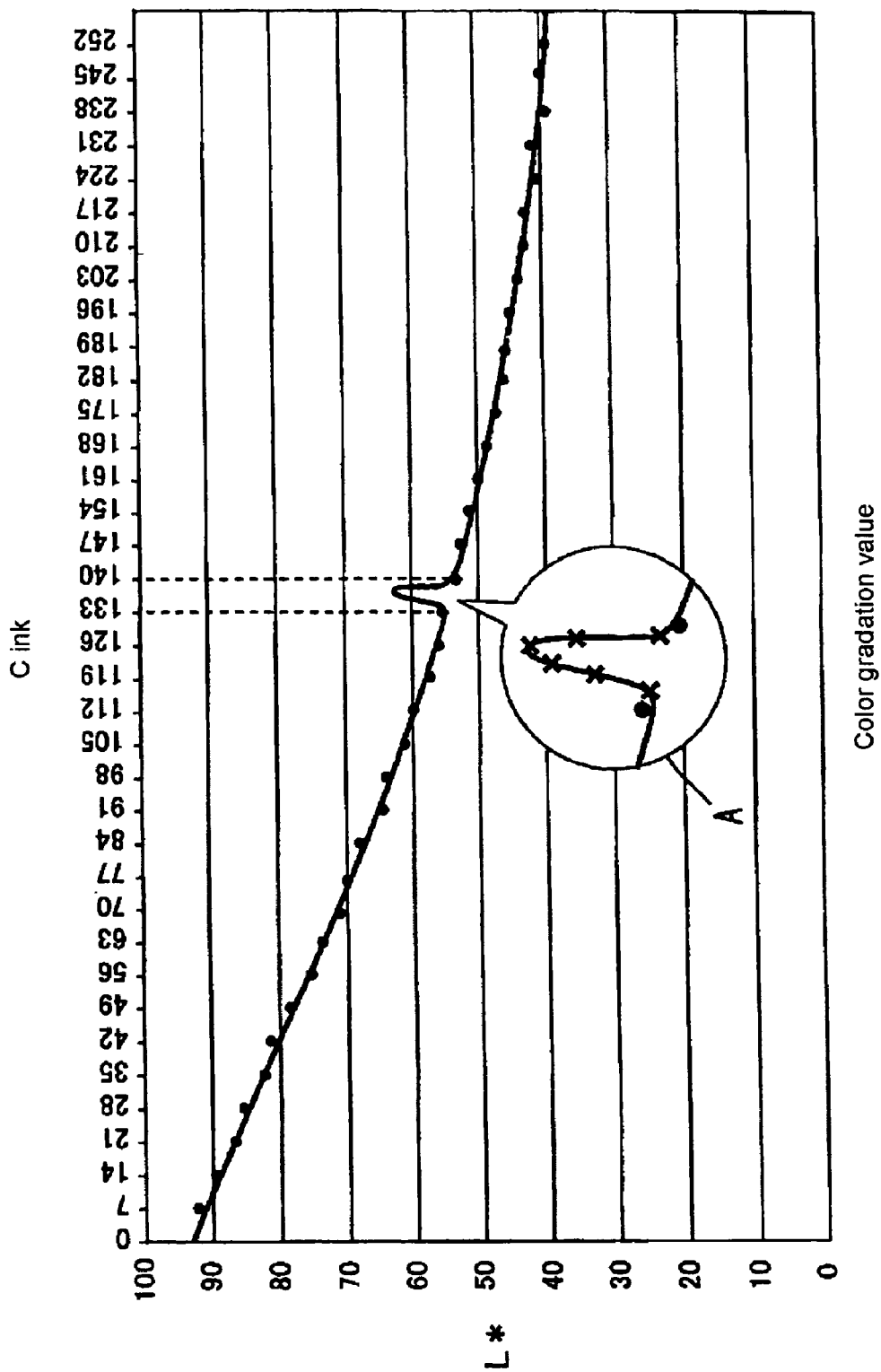
FIG. 8 is an illustration showing the relationship between color gradation values and L*.

FIG. 8 shows the relationship between color gradation values and L* when deviated points have been formed.

In the figure, the horizontal axis represents color gradation values and the vertical axis represents L* values. The enlarged detail A of the figure shows each color value (L*) interpolated at intervals of one color gradation value between the color values (black circle) acquired by colorimetry by the mark X. In this case, some values among the color values interpolated between the color gradation value C1 (133) and the color gradation value C2 (140) are at coordinate positions deviating from the characteristic mentioned above in that L* value declines when the color gradation value increase, and therefore they are detected as deviated points. For the detection of deviated points, for example, when the color gradation value is increased successively by one gradation value from zero and that the L* value acquired at a color gradation value is greater than the L* value corresponding to the color gradation of the preceding color gradation value, the color value corresponding to the color gradation value in question will be judged as a deviated point and will be detected as such. (sic)

When it is judged that a deviated point has been detected in step S420, with regard to the predetermined color gradation region including the deviated point, color values will be interpolated by switching to an interpolating method that makes it difficult to produce the deviated points (step S430). The predetermined color gradation regions include, for example, regions where several points existing on the higher color gradation value side from the deviated points detected and several points existing on the lower color gradation value side from among the color values plotted as the reference points for interpolation and actually measured. And in the region, spline interpolating calculations or linear interpolating calculations will be performed to interpolate the color values corresponding to each color gradation value by taking the color values of several points existing on the higher color gradation value side and the lower color gradation value side of the deviated points as reference points.

Figure 9:
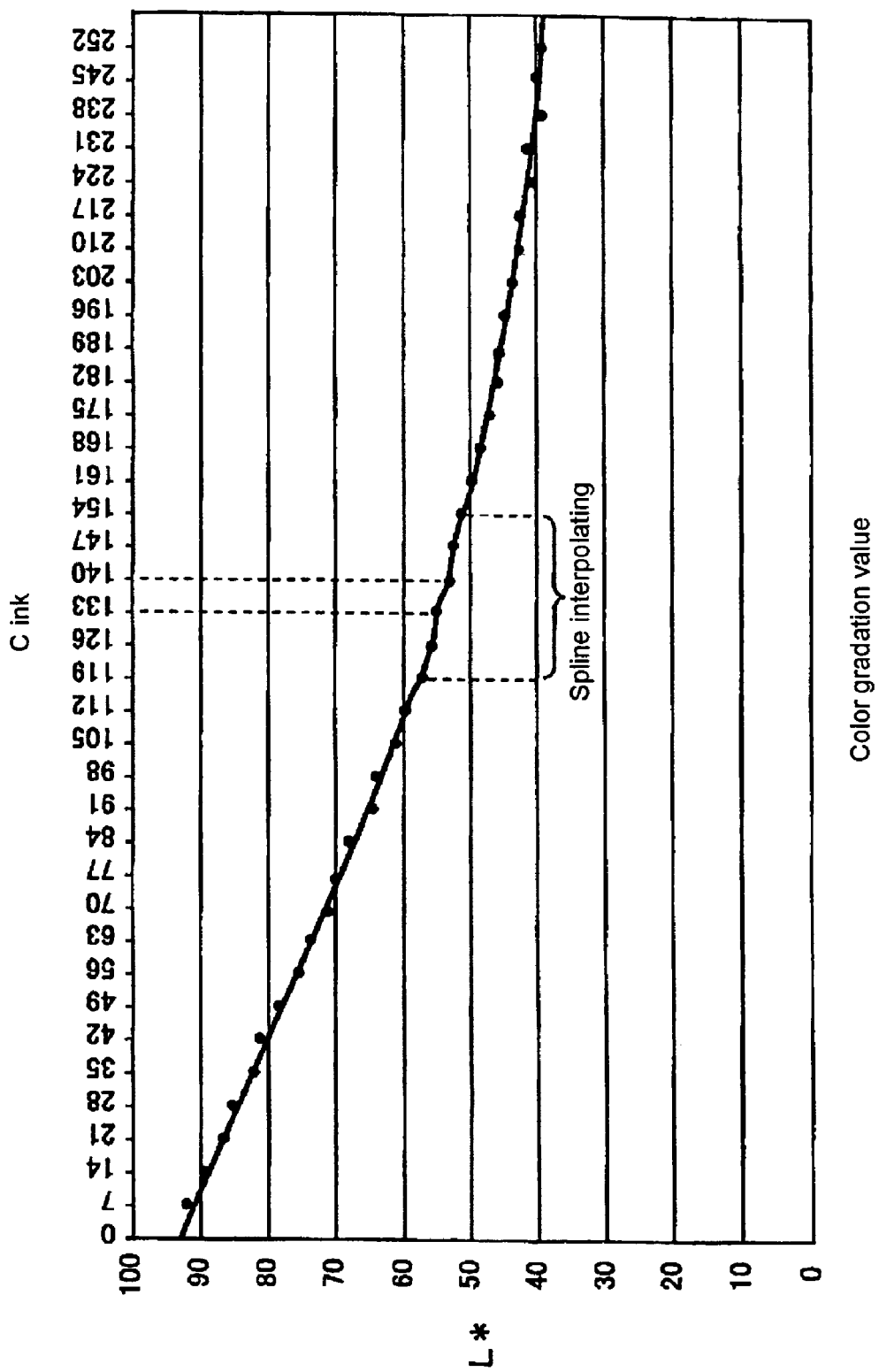
FIG. 9 is an illustration showing the relationship between color gradation values and L*.

FIG. 9 shows the relationship between the color gradation values and the L* value when spline interpolating calculations are performed for the predetermined color gradation regions including deviated points.

In the figure, three (3) points on the higher color gradation value side and three (3) points on the lower color gradation value side of the color gradation value where deviated points have been detected, or a total of six (6) points from among the color values plotted as the reference points and actually measured are taken as the reference points for performing spline interpolation. The spline interpolation is generally less accurate than the higher degree polynomial expression, but it is less likely to produce deviated points. Therefore, it is possible to suppress the development of deviated points while minimizing any decline of the accuracy of interpolation of the color values in general by switching to the spline interpolation only in the predetermined regions where the deviated points have developed by the interpolation using a higher degree polynomial expression.

In the meanwhile, the linear interpolating calculation described above is of course possible also as an interpolating calculation replacing the higher degree polynomial expression. Although the linear interpolating calculation is a less accurate interpolating method than the spline interpolation, it is preferable to the spline interpolation as an interpolating means for suppressing the development of deviated points. Therefore, it is possible to switch over from the higher degree polynomial expression to the linear interpolating calculation for the predetermined region where the deviated points have developed to interpolate each color value. Furthermore, from the viewpoint of suppressing the development of the deviated points while minimizing the decline of interpolating accuracy of color values as a whole, a plurality of stages of switching over the interpolating means may be made available. In other words, as for the predetermined regions where deviated points have appeared, the higher degree polynomial expression should be first replaced by the spline interpolating calculation to interpolate color values, and if deviated points are still detected, linear interpolation should be resorted to in the predetermined regions where deviated points have developed.

After interpolating the color values corresponding to all the color gradation values and obtaining the same in this way, the calibration module 21e produces a color correction table 15c2 by comparing the color values mentioned above and the standard values 15d mentioned above.

Figure 10:
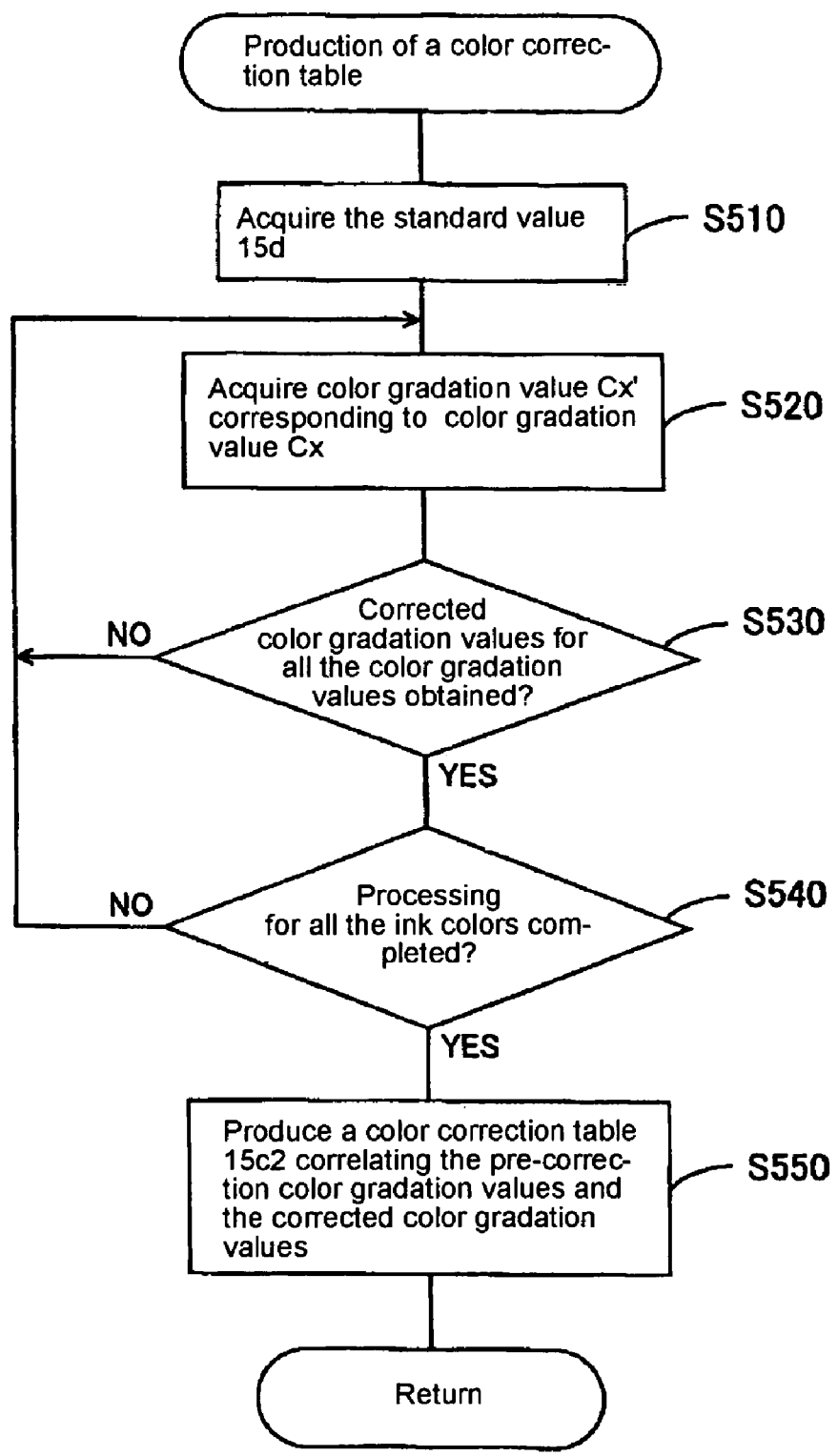
FIG. 10 is a flowchart showing the details of the producing process of a color correction table.

FIG. 10 is a flowchart describing in details the contents of processing for producing a color correction table 15c2.

The calibration module 21e obtains the standard values 15d recorded in the HDD 15 (step S510). And it obtains a color value whose color difference $\Delta E$ from the standard value corresponding to—color gradation value Cx is the minimum from among the color values corresponding to all the color gradation values mentioned above, and at the same time obtains a color gradation value Cx' corresponding to the color value acquired (step S520).

Figure 11:
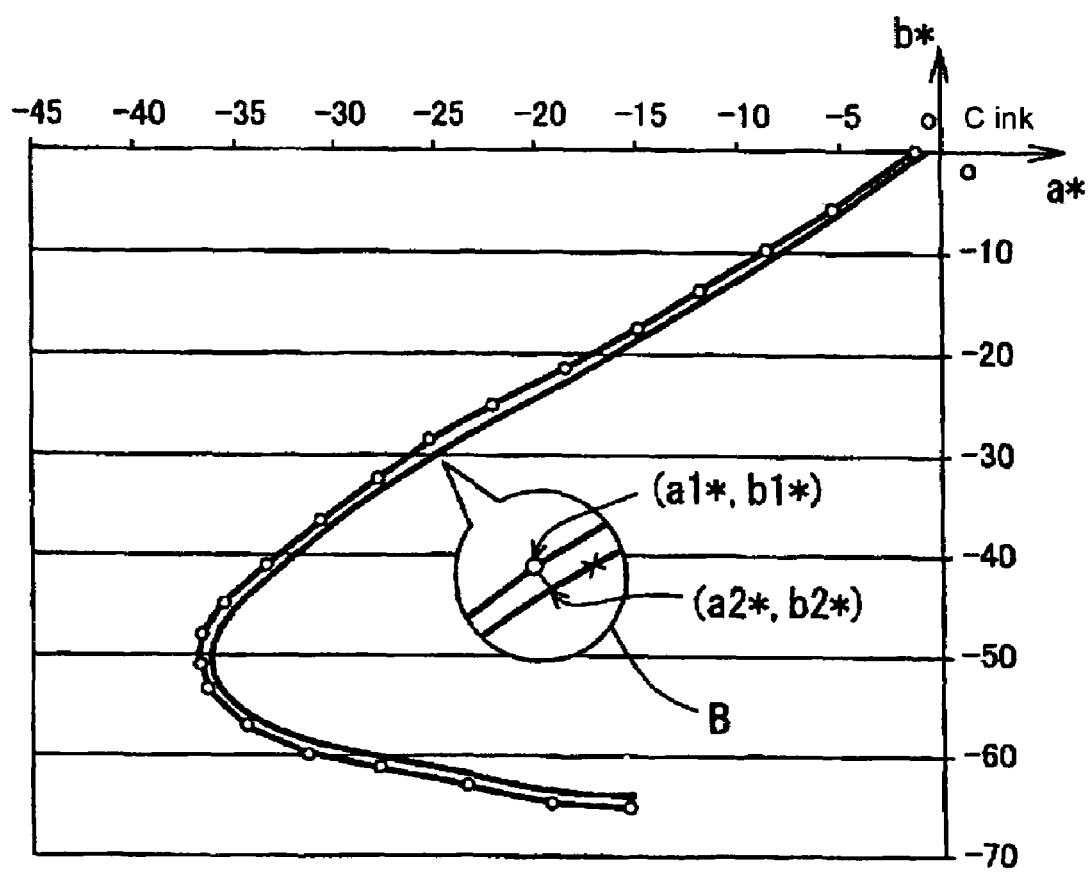
FIG. 11 is a projection chart projecting color values and standard values on the a*b* plane.

FIG. 11 shows a curve produced by the higher degree polynomial expression and the standard values on the same a*b* plane. In other words, the L*a*b* value in the L*a*b* color space which is a three-dimensional space is projected on the a*b* plane. In the meanwhile, the standard values are marked with white circles, but the indication of the standard values corresponding to all the color gradation values is omitted, and only some of the values are marked with white circles.

When there is no color drift in the printed results of the standard printer and the printer 40, the colorimetry of the printed results acquired (in this case, single color of cyan) when printed with a same color gradation value Cx should result in a same color value. However, when a color drift has occurred in the printed results of the standard printer and the printer 40, as shown in the figure, the line connecting the interpolating curve and the standard value will drift on the a*b* plane.

The enlarged detail B of the figure shows with white circle and X mark the color values of the printed results acquired by printing with the standard printer and the printer 40 with a same color gradation value Cx. The process detail shown in the enlarged detail B is described as follows: Color values (a2*, b2*) having the minimum color difference $\Delta E$ from the standard values (a1*, b1*) corresponding to the color gradation value Cx are sought from among the color values corresponding to all the color gradation values on the interpolated curve, and the color gradation value Cx' corresponding to the color value is acquired.

Such a processing will calculate a color gradation value Cx' for outputting by the printer 40 the equivalent output color as an approximation for the output color with the color gradation value Cx by the standard printer. When the correspondence relationship for transforming the calculated color gradation value Cx' into the corrected color gradation value, and the color gradation value Cx into the pre-correction color gradation value is fixed, it will be possible to produce a color correction table 15c2 that can correct highly accurately the color drift described above.

In the step S530, with regard to such standard values related to all the color gradation values, it will be judged whether color gradation values corresponding to the color values on the interpolated curve having the minimum color difference $\Delta E$ have been acquired or not. When it has been judged that the processing relating to all the color gradation values have not been completed, the processing of the step S520 will be repeated until the color gradation values corresponding to the standard values relating to all the color gradation values have been acquired. In the step S530, when it has been judged that the processing of the step S520 with regards to the standard values relating to all the color gradation values have been completed, in the step S540 it will be judged whether the processing subsequent to the step S520 with regards to all the ink colors used by the printer 40 have been completed or not.

In the step S540, when it has been judged that the processing subsequent to the step S520 with regards to all the ink colors have not been completed, the ink color that will be subject of processing will be changed and the processing subsequent to the step S520 will be repeated. In the step S540, when it has been judged that the processing subsequent to the step S520 with regards to all the ink colors haven been completed, the calibration module 21e will produce a color correction table 15c2 that fixes the correspondence relationship between the pre-correction color gradation values and the corrected color gradation values calculated as described above across all the color gradation values for each color (step S550).

It is possible to perform a calibration by renewing the color correction table 15c1 produced by the manufacturer of the printer 40 before the shipment of the printer 40 with the color correction table 15c2 produced. In other words, the choice of the color gradation values converted by the color converting module 21b as the input values, the correction of the color gradation values by referring the color correction table 15c2, and finally the input of corrected image data into the halftone processing module 21c will produce equivalent output colors similar to those of the standard printer.

(3) Conclusion

Thus, the color values corresponding to all the color gradation values will be interpolated with a high accuracy by referring the color values acquired by performing a colorimetry of the patch sheet 60 and by using a higher degree polynomial expression. And a color correction table 15c2 will be produced fixing the extent of correction that should be made for all the color gradation values by contrasting the color values corresponding to all the color gradation values interpolated with a high accuracy and the standard values. The use of such a color correction table 15c2 will enable to carry out a calibration with a higher degree of accuracy than the case of using the conventional color correction table produced by interpolating the correction calculated for a plurality of color gradation values across all the color gradation values.

The foregoing invention has been described in terms of preferred embodiments. However, those skilled, in the art will recognize that many variations of such embodiments exist. Such variations are intended to be within the scope of the present invention and the appended claims.

I claim:

1. A color image data correcting method for producing a color correction table for correcting multiple gradation color image data in order to correct color drifts in the printed results by printing devices and for correcting the color image data by means of the color correction table, the method comprising:

printing predetermined color patches on the basis of patch image data for printing a plurality of patches of which color gradation values have been changed for each color of each color material for recording used in the printing devices;

acquiring the color values of the color patches by measuring the color of the printed color patches;

interpolating the color values corresponding to all the color gradation values of the color correction table by referring the color values acquired and by using a predetermined function; and contrasting the color values corresponding to all the color gradation values acquired by the interpolation and the standard values that are the color values of the standard printed results, and on the basis of the contrast result, producing a color correcting table for correcting the color image data so that printed results equivalent to the standard printed results corresponding to the color image data of any color gradation values may be acquired by the printing devices, wherein, in interpolating and obtaining color values, a predetermined higher degree polynomial expression having the color gradation value is selected as a variable by referring to the color value acquired, and the higher degree polynomial expression is used to interpolate color values corresponding to all the color gradation values, and wherein, in interpolating and obtaining color values, deviated values formed at coordinates in the predetermined direction from the assumed interpolated curve in the predetermined color space among the color values interpolated by the higher degree polynomial expression are detected, and color values are interpolated by switching over from the higher degree polynomial expression to interpolating calculations unlikely to result in deviated points in color gradation regions where the deviated points are detected.

2. The color image data correcting method according to claim 1, wherein, in interpolating and obtaining color values, the deviated points are detected based on the characteristics of changes in color values as compared with changes in color gradation values.

* * * * *